Feb. 22, 1938.                    C. LE BLEU                    2,109,393
                      TRAILBUILDER, BULLDOZER, AND THE LIKE
                            Filed June 4, 1935          3 Sheets-Sheet 2
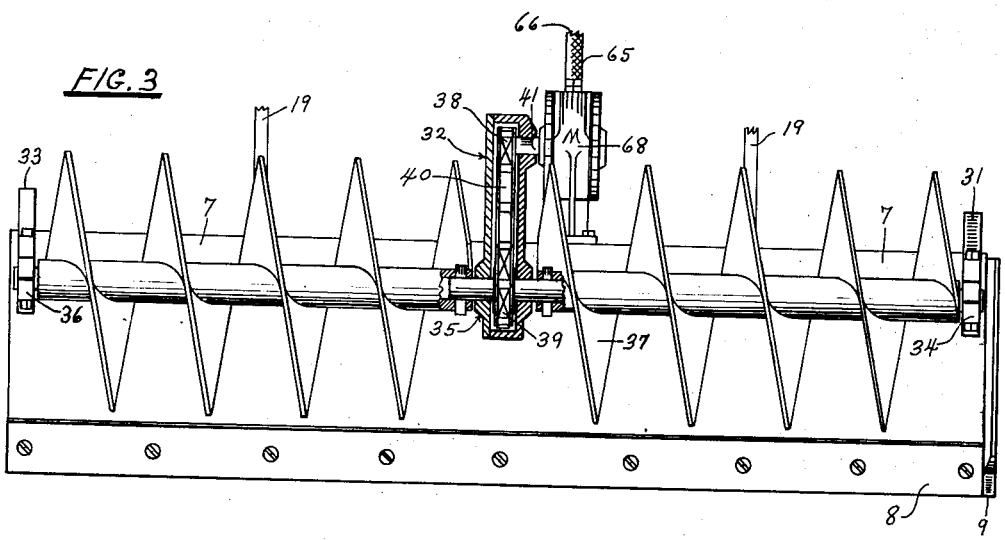
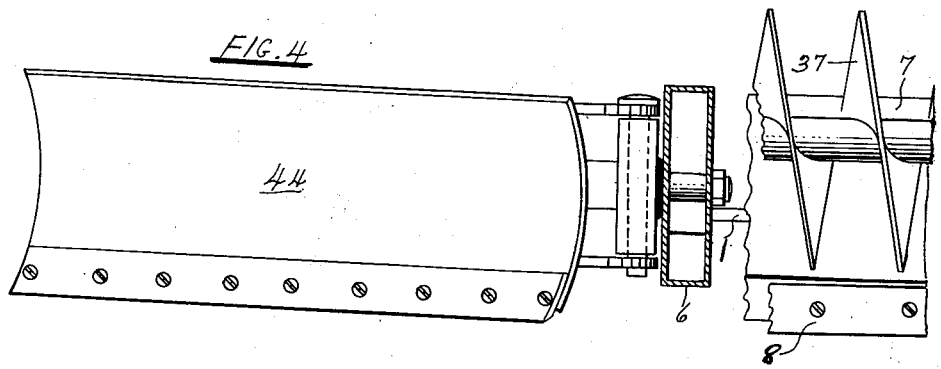
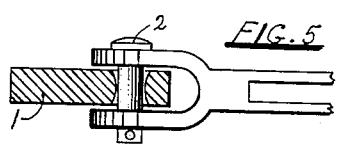
INVENTOR
Charles Le Bleu Feb. 22, 1938. C. LE BLEU 2,109,393
TRAILBUILDER, BULLDOZER, AND THE LIKE
Filed June 4, 1935 3 Sheets-Sheet 3

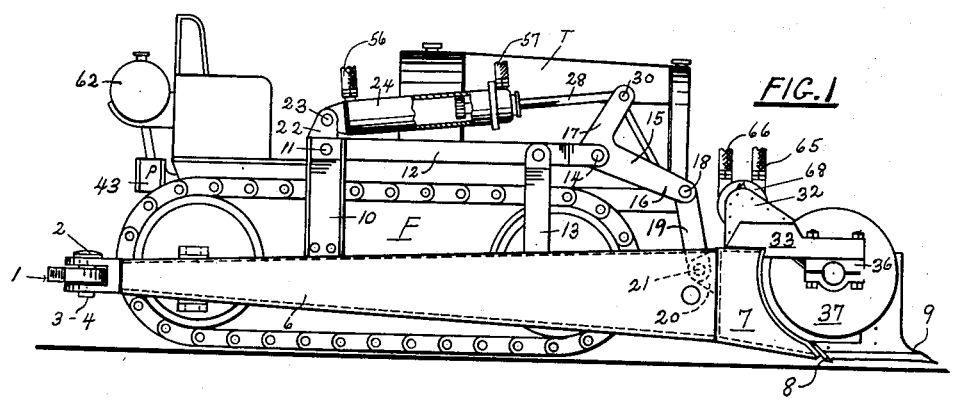

FIG. 6

INVENTOR
Charles Le Bleu

Patented Feb. 22, 1938

2,109,393

UNITED STATES PATENT OFFICE 2,109,393

TRAILBUILDER, BULLDOZER, AND THE LIKE

Charles Le Bleu, Los Angeles, Calif.

Application June 4, 1935, Serial No. 24,963

8 Claims. (Cl. 37—108)

This invention relates to earth moving devices, the term "earth" being taken in the broad sense to include snow, ice, and the like, adapted to be supported on a tractor to be moved across the surface of the earth thereby, whereby earth is scraped up and removed. Such earth moving devices are usually termed trailbuilders, bulldozers, backfillers, snow plows, and the like.

Such devices as usually constructed include a digging or scraping element disposed in operation at a transverse angle to the line of travel and ahead of the tractor.

When such a device is operated as a bulldozer, the scraping element is usually placed at right angles to the line of travel, and accumulated earth is discharged in the path of the line of travel.

When such a device is operated as a trailbuilder, or a backfiller, the accumulating earth is usually to be discharged at the side of the device, and this is accomplished by adjusting the scraping element through a horizontal plane so that it lies longitudinally at an angle to the line of travel and the right angle thereto, so that as the tractor advances the accumulating earth will drift longitudinally along the scraping element and finally past the end thereof to the side of the device.

I have observed, however, that the above described method of accomplishing side delivery of the accumulated earth cannot always be depended upon to obtain the desired results, since the drift of the accumulating earth longitudinally of the scraping element is not directly under the control of the operator. Thus, when the device is advancing, earth is being continuously discharged at the side thereof, whereas it is desirable simply to accumulate earth at certain points along the line of travel and discharge at the side of the device at certain other points along the line of travel. Thus, in building trails or roadways around the sides of mountains, the earth removed at wide points in the trail need not be discharged at the wide point, but can be accumulated and discharged at narrow points at the will of the operator.

Therefore, the principal object of this invention is to provide in a device of the class described, means to move the scraped up earth transversely of the line of travel to be discharged at the side of the device.

Still another object is the provision in a device of the class described, of rotary means to move the scraped up earth longitudinally of the scraping element to be discharged at the end thereof.

Still another object is the provision in a device of the class described, of a screw conveyor to move the scraped up earth longitudinally of the scraping element to be discharged at the end thereof.

Still another object is the provision in a device of the class described, of means under the control of the operator during the advancing movement of the device, operable to cause the scraped up earth to be discharged to the side of the device, or not, at the will of the operator.

Still another object is the provision in a device of the class described, of an auxiliary scraping element extending from the main scraping element rearwardly along the side of the device to move the earth discharged at the end of the main scraping element to a greater distance to the side of the device, or simply to spread the earth discharged at the end of the main scraping element.

Other and further features and objects of the invention will be apparent to those skilled in the art, upon consideration of the attached drawings and the following specification, wherein I have disclosed only one exemplary embodiment of my invention, with the understanding that such changes may be made in the combination, correlation and construction of parts, members and features as do not form a departure from the spirit of the invention as defined in the claims.

Referring to the drawings:

Figure 1 is a side elevation of the device embodying my invention, with the auxiliary scraping element removed.

Figure 2 is a plan view of Figure 1, with the auxiliary scraping element in place.

Figure 3 is a front view, partly in section, of the main scraping element and conveyor.

Figure 4 is a fragmentary front view of the main scraping element and conveyor, and a side frame in section with auxiliary scraping element attached.

Figure 5 is a side view partly in section of the drawbar connection.

Figure 6:
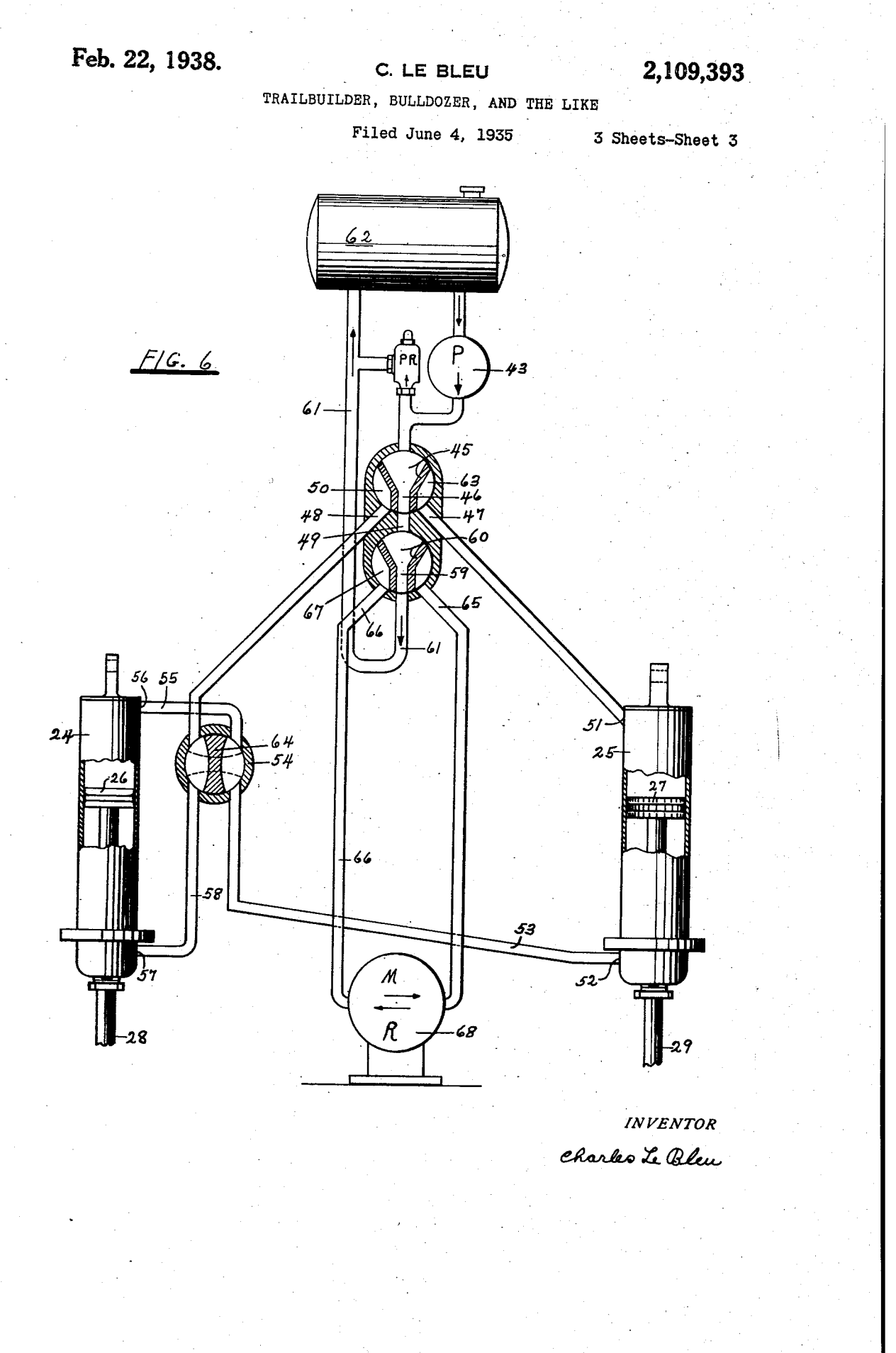

Figure 6 is a diagrammatic view of a hydraulic control means for the device for manipulating the various elements for raising and lowering and tilting transversely the scraping means, and operating the conveyor.

The device as shown comprises a drawbar 1, rockably connected to the tractor T at 2, as shown in Figure 5. Connected to the drawbar 1 at each end thereof, by pins 3 and 4, are side beams 5 and 6 extending thence forwardly to a connection with a scraping element comprising a box-like structure 7 extending transversely of and in front of the tractor T, and having at its forward lower edge scraper blade 8, and having detachably secured at one end a side cutter 9.

Rigidly secured to each of the track frames F on each side of tractor T are brackets 10, having at their upper ends stub shafts 11, on which are pivoted the rear ends of beam 12, pivotally supported near their forward ends on the upper ends of uprights 13 pivoted at their lower ends to track frame F. The forwardly extending overhanging portion of beams 12 carry a fulcrum pin 14. This pin provides a pivotal support for a bell crank 15, having legs 16 and 17. Leg 16 extends forwardly and carries at its forward end a pivot pin 18 which serves to pivotally connect shackles 19 at its upper end to leg 16; shackles 19 being pivotally secured at their lower ends to brackets 20 by pivot pins 21; said brackets 20 being rigidly secured to the back wall of the box structure 7.

Rigid with beam 12 at its rear end, are brackets 22, carrying at their upper ends pivot pin 23. Pin 23 pivotally supports the plugged end of hydraulic cylinders 24 and 25. Within cylinders 24 and 25 are pistons 26 and 27 on piston rods 28 and 29, pivotally secured at their forward end by pivot pin 30 to the upstanding leg 17 of bell crank 15.

Attention is directed to the fact that cylinders 24 and 25 are of different diameters. The reason for this is as follows: Piston 27 is moved inwardly in cylinder 25 by the fluid displaced from the plugged end of cylinder 24 as the piston 26 is moved inwardly therein. Thus the fluid displaced from the plugged end of cylinder 24 during a given travel of piston 26, into the rod end of cylinder 25 would, if the cylinders were of equal diameter, cause a greater movement of piston 27 in cylinder 25 than the distance traveled by piston 26 in cylinder 24, due to the fact that there is a rod 29 in the rod end of cylinder 25, whereas there is no rod in the plugged end of cylinder 24. Therefore, the cylinder 25 is of greater diameter than cylinder 24 to the extent that the displacement of the plugged end of cylinder 24 and the rod end of cylinder 25 is equal, thus securing equality of travel. The actual flow of liquid will be discussed further on in connection with the operation of the device.

Elements 31, 32, and 33 are bearing hangers secured at the rear ends thereof to the scraping element, and provided at their forward ends with bearings 34, 35 and 36, having journaled therein a screw conveyor 37.

The hanger 32 comprises a box-like structure provided with a removable cover plate as shown. This box-like structure serves as a housing for a driving means to revolve the screw conveyor 37. As here shown the driving means comprises a driving sprocket wheel 38, a driven sprocket wheel 39 suitably secured to conveyor 37, whereby when the sprocket wheel 39 is revolved the conveyor 37 will be revolved, and an endless sprocket chain 40 passing around the sprocket wheels 38 and 39.

The driving sprocket wheel 38 is suitably secured to the power shaft 41 of a motor mechanism, which may be of any suitable type, such as internal combustion, electric, or fluid. The specific means here shown is a fluid motor 68, of the reversible type, adapted to receive fluid under pressure from a pump 43 which is operated by the motor of the tractor. The actual flow of fluid to and from the motor 68 will be described in connection with the operation of the device.

The device is provided with an auxiliary scraping and spreading element 44, adjustably secured at its forward end to the side beam 6 near its forward end, and is adjustably secured at the rear end to side beam 6 near its rear end. Note that the auxiliary scraping element 44 may be removed and is adapted to be mounted on either of the side beams 5 and 6, or an auxiliary scraping element may be mounted on both the side beams 5 and 6 at the same time. This auxiliary scraping element 44 is intended to serve as an adjustable continuation of the main scraping element to scrape up earth, spread earth discharged at the side of the device by the screw conveyor, or to move said earth to a greater distance from and to the side of the device. Obviously, a screw conveyor could also be mounted on the auxiliary scraping element if desired, in the same manner as the conveyor on the main scraping element.

In operation, the device is moved across the surface of the earth by the tractor T, and the raising and lowering and transverse tilting of the scraping element is accomplished as follows: All elements being in the adjusted position shown, to lower the scraping element to a position to scrape up earth, rotate valve plug 45 counterclockwise to align port 46 with conduit 47, and to connect conduit 48 with conduit 49 by way of side port 50. Thus, fluid under pressure will flow from the pump 43 into and through port 46 into conduit 47 connected to the plugged end of cylinder 25 at 51. Piston 27 will move outwardly and the fluid displaced from the rod end of cylinder 25 at 52 will flow through conduit 53, valve 54, and conduit 55 to enter the plugged end of cylinder 24 at 56. Piston 26 is thus moved outwardly and the fluid thus displaced from the rod end of cylinder 24 at 57 will flow through conduit 58, valve 54 and conduit 48, thence through side ports 50 into conduit 49, thence into port 59 of valve plug 60. With valve plug 60 in the position shown, the fluid would then enter conduit 61 from port 59 and thus return to reserve tank 62. Thus, both pistons 26 and 27 have moved outwardly an equal distance, causing movement of bell cranks 15 to lower the scraping element into scraping position. When the desired adjustment is attained the valve plug 45 is rotated clockwise to again assume the position shown.

Raising the scraping element is accomplished by rotating valve plug 45 clockwise to align port 46 with conduit 48, and to connect conduit 47 with conduit 49 by way of side port 63. Fluid under pressure will thus flow from pump 43 through port 46 into conduit 48, thence through valve 54 and conduit 58 into the rod end of cylinder 24 at 57. Thus piston 26 will move inwardly and the fluid thus displaced from the plugged end of cylinder 24 at 56 will flow through conduit 55, valve 54 and conduit 53 to enter the rod end of cylinder 25 at 52. Thus piston 27 will move inwardly and the fluid thus displaced from the plugged end of cylinder 25 at 51 will flow through conduit 47 into side port 63, thence into conduit and valve plug 60. With valve plug 60 in the position shown, the fluid will then flow from valve plug 60 and port 59 into conduit 61, thence into the reserve tank 62. When the desired elevation of the scraping element is attained, valve plug 45 is again returned to the position shown.

Valve 54 is used to secure connections of conduits 48, 53, 55 and 58 in a manner that will cause pistons 26 and 27, upon the proper operation of valve plug 45, to move in opposite directions to transversely tilt the scraping element. When the plug 64 of valve 54 is rotated to the dotted position, conduits 48 and 55 will be in connection and conduits 53 and 58 will be in connection. Then if valve plug 45 is operated as heretofore explained the result will be simultaneous movement of pistons 26 and 27 in opposite directions. When the desired transverse tilt of the scraping element is thus obtained valve plug 64 is returned to the position shown and the scraping element will be maintained in a transverse tilted position and may be raised and lowered without disturbing the tilt, as heretofore described, by operation of valve plug 45.

Thus the scraping element is adapted to be raised, lowered and tilted transversely.

Valve plug 60 is used to control the operation of the screw conveyor 37 as follows: All elements being in the position shown, the screw conveyor 37 would be rotated clockwise as we look at Figure 1. Valve plug 60 is rotated counterclockwise to align port 59 with conduit 65, and to connect conduit 61 with conduit 66 by means of side port 67. Thus fluid under pressure will flow through conduit 65 into fluid motor 68, causing clockwise rotation of power shaft 41 and conveyor 37. Under these conditions fluid flows from fluid motor 68 into conduit 66, thence by way of side port 67 into conduit 61, and thence into reserve tank 62. Reverse operation of screw conveyor 37 is accomplished in a like manner by rotating valve plug 60 in a clockwise direction. Thus it is apparent that screw conveyor may be operated in either direction to convey the accumulating earth to the side of the device. It is also apparent that the accumulated earth may be discharged, or not, at the will of the operator, at the side of the device, that is, at right angle to the line of travel, without the necessity of turning the tractor from its course. It is likewise apparent that accumulated earth may be discharged in the path of the line of travel by raising, from contact with the ground, the scraping element, thus permitting the earth to drift under the scraper blade 8.

Having thus described my invention, I claim:

1. The combination in a device of the character disclosed; a tractor; a pair of spaced apart side frames carrying at one end an earth scraping element; said element being provided with a forwardly projecting side cutter and open at its other end for passage of material, means for swingingly connecting said side frames to said tractor; means for swinging said side frames to raise and lower said earth scraping element, and means mounted on the device and operable to cause earth to be discharged upon the ground outside the path of the line of travel to the side of the device.

2. The combination in a device of the character disclosed; a tractor; a pair of spaced apart side frames carrying at one end an earth scraping element; said element being provided with a forwardly projecting earth working tool and being open at one end thereof to allow for the passage of material, means connecting said side frames to said tractor for longitudinal and transverse tilting movement; means to tilt said side frames, whereby said scraping element may be raised or lowered or tilted transversely; and means mounted on the device to move earth longitudinally of the scraping element and across the line of travel of the device, to be discharged upon the ground at the side of the device.

3. In a device of the character described; a pusher frame; a scraper open at one end and provided with a closure at the opposite end, said closure being formed with a forwardly projecting earth working tool, said scraper adapted to be mounted on said pusher frame; means for connecting said pusher frame to a carrying vehicle for longitudinal and transverse tilting movement thereto; means for tilting said pusher frame to raise, lower and transversely tilt said scraper; and means mounted on the device for moving earth transversely of the line of travel, to be discharged upon the ground at the side of the device.

4. In a device of the type described, a tractor, a pusher frame swingably mounted at its rear end to the tractor, a dirt moving element carried on the forward end of the pusher frame, a spiral conveyor journaled longitudinally of and to the dirt moving element, an end closure formed on one end of said element and provided with a forwardly projecting dirt working tool, the opposite end of said element being open to allow for the outward passage of material being moved by the conveyor longitudinally of the dirt moving element from its closed end to its open end where it is discharged along and at the side of its path of travel.

5. In a device of the type described a tractor, a pusher frame swingably mounted at its rear end to the tractor, a scraping element having a scraping blade carried on the forward end of the pusher frame, a conveyor operably mounted longitudinally of and within the scraping element, said scraper element being formed at one end with a closure having a forwardly projecting earth working tool, and being open at its opposite end to allow for the passage of material, operable means connected to the conveyor to cause a rotation of the conveyor whereby material will be moved longitudinally of the scraper element and outwardly through the open end, and operable means to swing the pusher frame to selectively cause a transverse or longitudinal tilting movement of the scraper element.

6. A dirt moving and grading machine comprising a tractor, a pair of frame elements one disposed at each side of said tractor, means at their rear ends for connecting them transversely, means for articulately connecting said transverse means to the tractor, a scraper blade extending transversely at the tractor at its forward ends, said blade being supported upon the free ends of the frame elements, an end closure carried at one end of said blade and projecting forwardly therefrom, a dirt working tool carried thereby, a helical conveyor carried by the blade and positioned in advance thereof, means for driving said conveyor whereby dirt will be moved longitudinally of the blade in a direction away from the end closure to be discharged upon the ground around the path of travel of the machine and beyond the opened end of the blade, and means for adjustably moving the blade and its supporting frame to transversely and longitudinally tilt said scraper blade and the conveyor carried thereby.

7. The device defined in claim 6, and an auxiliary blade carried upon the frame element adjacent to the opened end of the scraper blade and whereby the discharged material may be spread as the machine advances.

8. A dirt moving and grading machine comprising a tractor, a pair of frame elements one disposed at each side of said tractor, means at their rear ends for connecting them transversely, means for articulately connecting said transverse means to the tractor, a scraper blade extending transversely at the tractor at its forward ends, said blade being supported upon the free ends of the frame elements, an end closure carried at one end of said blade and projecting forwardly therefrom, a dirt working tool carried thereby, a helical conveyor carried by the blade and positioned in advance thereof, means for driving said conveyor whereby dirt will be moved longitudinally of the blade in a direction away from the end closure to be discharged upon the ground around the path of travel of the machine and beyond the opened end of the blade, and means for adjustably moving the blade and its supporting frame to transversely and longitudinally tilt said scraper blade and the conveyor carried thereby, and an auxiliary blade carried upon the frame element adjacent to the opened end of the scraper blade and whereby the discharged material may be spread as the machine advances, and means for adjustably disposing said auxiliary blade at different angles to the path of travel of the machine.

CHARLES LE BLEU.